US008475283B2

(12) United States Patent
Guinn et al.

(10) Patent No.: US 8,475,283 B2
(45) Date of Patent: Jul. 2, 2013

(54) PLAYER INCENTIVES FOR WAGERING GAME TRANSFERS

(75) Inventors: Andrew C. Guinn, Chicago, IL (US); Harry C. Lang, Clapham (GB); Richard B. Robbins, Glenview, IL (US); Richard T. Schwartz, Deerfield, IL (US); Alfred Thomas, Las Vegas, NV (US)

(73) Assignee: WMS Gaming, Inc, Waukegan, IL (US)

( * ) Notice: Subject to any disclaimer, the term of this patent is extended or adjusted under 35 U.S.C. 154(b) by 0 days.

(21) Appl. No.: 13/479,237

(22) Filed: May 23, 2012

(65) Prior Publication Data

US 2012/0302324 A1 Nov. 29, 2012

Related U.S. Application Data

(60) Provisional application No. 61/489,532, filed on May 24, 2011.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................... 463/42; 463/16; 463/25; 463/29

(58) Field of Classification Search
USPC .............................. 463/16–20, 25, 29, 40–42
See application file for complete search history.

(56) References Cited

U.S. PATENT DOCUMENTS

| | | | | |
|---|---|---|---|---|
| 5,718,632 | A | 2/1998 | Hayashi | |
| 2003/0228912 | A1* | 12/2003 | Wells et al. | 463/43 |
| 2004/0048667 | A1* | 3/2004 | Rowe | 463/40 |
| 2005/0153778 | A1* | 7/2005 | Nelson et al. | 463/42 |
| 2006/0160622 | A1* | 7/2006 | Lee et al. | 463/42 |
| 2007/0004506 | A1* | 1/2007 | Kinsley et al. | 463/29 |
| 2007/0060361 | A1* | 3/2007 | Nguyen et al. | 463/42 |
| 2007/0060394 | A1* | 3/2007 | Gowin et al. | 463/47 |
| 2007/0105628 | A1* | 5/2007 | Arbogast et al. | 463/42 |
| 2007/0191107 | A1 | 8/2007 | Walker et al. | |

(Continued)

FOREIGN PATENT DOCUMENTS

GB 2491270 11/2012

OTHER PUBLICATIONS

"UK Application GB1209321.7 Examination Report", Sep. 24, 2012 , 4 pages.

(Continued)

*Primary Examiner* — Milap Shah
(74) *Attorney, Agent, or Firm* — DeLizio Gilliam, PLLC

(57) ABSTRACT

A method includes receiving a request, from a device, to play a light version of a wagering game based on communications over a network. The method includes transmitting, to the device, wagering game content associated with execution of the light version of the wager game. The method includes prompting download of a full version of the wagering game over the network from a remote server during the executing of the light version of the wagering game, wherein the full version of the wagering game has more game features than the light version of the wagering game. The method includes responsive to acceptance of the download of the full version of the wagering game to the device, downloading the full version of the wagering game and providing a reward for the downloading of the full version of the wagering game.

25 Claims, 9 Drawing Sheets

U.S. PATENT DOCUMENTS

| | | | | |
|---|---|---|---|---|
| 2008/0064501 | A1* | 3/2008 | Patel | 463/40 |
| 2008/0188311 | A1* | 8/2008 | Topham et al. | 463/42 |
| 2009/0029776 | A1* | 1/2009 | Ruppert et al. | 463/42 |
| 2009/0239660 | A1 | 9/2009 | Acres | |
| 2011/0143832 | A1 | 6/2011 | Walker et al. | |
| 2011/0275438 | A9 | 11/2011 | Hardy et al. | |

OTHER PUBLICATIONS

U.S. Appl. No. 13/679,914, filed Nov. 16, 2012, Robbins, B R., et al.

* cited by examiner

PLAYER INCENTIVES FOR WAGERING GAME TRANSFERS

RELATED APPLICATIONS

This application claims the priority benefit of U.S. Provisional Application Serial No. 61/489,532 filed May 24, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to wagering game systems including incentives for wagering game transfers.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Figure 1:
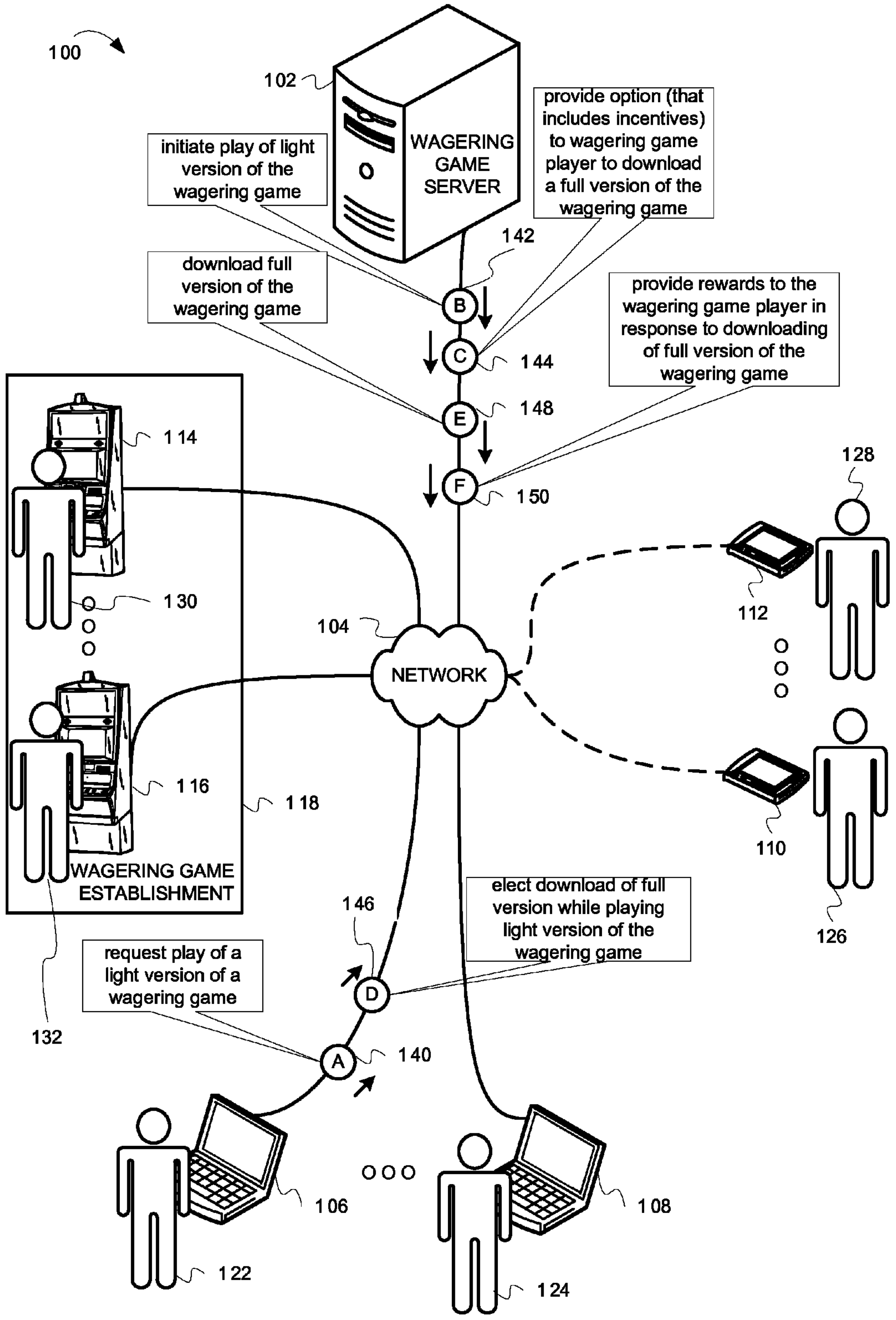
FIG. 1 depicts a system for providing rewards to wagering game players to download a full version of a wagering game into their player device during initiating or play of a light version of the wagering game, according to some example embodiments.

This description of the embodiments is divided into six sections. The first section provides an introduction to some example embodiments, while the second section describes an example system environment. The third section describes example operations performed by some embodiments and the fourth section describes an example player device architecture. The fifth section describes example player devices, and the sixth section presents some general comments.

Introduction

This section provides an introduction to some example embodiments. Some example embodiments relate to downloading a full version of a wagering game from a remote server while a wagering game player is playing a light version of the wagering game. Some example embodiments also provide various incentives and rewards to a wagering game player to download the full version of the wagering game from a remote server, while the wagering game player is playing the light version. The download can be into any type of device (e.g., a player's home computer, mobile device (such as a smart phone), a wagering game machine at a wagering game establishment, etc.). Also, while described relative to wagering games, some example embodiments can be used for any type of application, game, etc. that including a light version and a full version of the application, game, etc.

The light version of a wagering game can be defined as being of a smaller size and having less features in comparison to the full version of the wagering game. The full version of a wagering game can be defined such that at least part of the game assets used for executing the wagering game are stored in nonvolatile machine readable media in the player device where the wagering game is being executed. Game assets can include a component that can be called by the executable of the wagering game during execution to produce various features of the wagering game. Examples of game assets can include bonus play, images, animations, video clips, sound tracks, art (e.g., reel strip and virtual image display information), math tables (e.g., probability distribution tables, pay tables, etc.), etc. In contrast, a light version of the wagering game can be defined such that the executable for the wagering game is not stored in nonvolatile readable media in the device where the wagering game is being executed. For example, the light version of the wagering game can occur in a web browser on the player device.

Accordingly, the play of the full version of the wagering game provides a fuller and better experience in comparison to the light version because more assets are available and/or a fuller and better version of a given asset is available for the full version in comparison to the light version. For example, a light version of a wagering game can have a low definition animation, image, sound, etc.; while the same animation, image, sound, etc. for a full version of the wagering game will be a higher definition. In another example, an animation, image, sound, etc. that is available for a full version of the wagering game may be unavailable for the light version. Also, a bonus that is available for a full version of the wagering game may be unavailable for the light version. Accordingly in some example embodiments, differences between the full version and the light version of the wagering game can include the look-and-feel of the game, the actual game play or both.

For example, the full version of the wagering game can use some feature (e.g., a big event feature) that may not be available for the light version. An example of such a feature can be a feature wherein a portion of the expected value of a main game of the wagering game can be set aside for a secondary event. A win for this secondary event can then occur at any time the main game is being played. In other words, the secondary event would serve as an additional bonus round for the wagering game. Such a configuration encourages players to download the full version because of the features provided therein that is not provided in the light version.

In some example embodiments, the random number generator and accounting for the wagering game results for a wagering game are executed at a remote server. Accordingly, the random numbers can be pushed out to the player's device, and the wagering game results can be returned to the remote server. In some other example embodiments, at least one of the random number generator and accounting for the wagering game results for a wagering game can be executed at the player device.

Downloading of the full version onto a local player device provides stickiness. In particular, a player is more likely to play a wagering game if the game is a downloaded application on their device. This is in contrast to game play that is through a web browser. Specifically, the player can be more likely to play a wagering game if they see an icon for the game in their background, a listing among the programs that can be executed, etc. Also, the player does not have to wait for an Internet connection, then locate the Internet address, etc.

In some example embodiments, as the player is playing a light version of the wagering game, the player is prompted to download the full version. Also, the player continues to play the light version as the full version is being downloaded. For example, after initiation of the light version of the wagering game but prior to game play, the player is provided an option to download the full version.

In response to downloading the full version while playing the light version, the player is rewarded with various rewards. Various rewards can include bonus credits, time-based multipliers, increased expected values for payouts, etc. for at least one of the light version and the full version of the wagering game. Various rewards can also include loyalty points for their player accounts that can translate into various prizes, discounts, etc. (e.g., free meal, free drinks, etc.). For example, a player can receive loyalty points for initiating the download and also receive at least one of bonus credits, time-based multipliers and increased expected values for the full version of the wagering game.

The rewards can be provided as certain percentages of the download are achieved. For example, the player can receive a bonus credit for every 10% of the download of the full version. Also, the player can be provided with additional rewards that they were not aware of until after the download is complete. For example, the additional rewards can double the number of bonus credits that were given during the download. These surprising additional rewards can provide the player with an incentive to download full versions of other wagering games—in anticipation of these additional rewards that may be provided for other downloads.

Other rewards can include allowing the player to change or personalize the look and feel of the wagering game, allowing the player to access certain content, allowing the player to unlock bonus episodes, etc. Other rewards can also include power up or points to advance up a leader board that includes the highest level winners of the wagering game. In some example embodiments, the rewards are not related to the wagering game. For example, the rewards can include a free drink, meal, entry into a drawing for various prizes, etc.

Another reward can include a display widget used for displaying various data on the player's device. For example, in addition to providing a visual tracking of the various downloads of the full versions, the widget can provide notification when certain progressive jackpots have reached a certain monetary amount (e.g., $25,000, $30,000, etc.) for some or all wagering games, the time lapse since the reset of the progressive jackpot for some or all wagering games, etc. The widget can also provide a tracking meter for these progressive jackpots based on monetary amount, the time lapse, etc. This feature would enable the player to start play of a particular wagering game (that has a progressive jackpot) have a certain level of the progressive jackpot has been reached. Such a widget can enhance the player experience even when the player is not playing a wagering game.

In some example embodiments, the reward can include a Quick Response (QR) code (that is a two dimensional bar code) that is displayed on the player's device. The QR code can be linked to various rewards (e.g., coupons for a drink or food, free mini-game play, bonus credits for a wagering game, etc.). Accordingly, the player can use their mobile phone or other device that is configured to read a QR code. The player can capture the QR code with such a device and can then be redirected to a website for the various rewards.

After the full version is downloaded, the light version can be replaced with the full version. In some example embodiments, the replacement is a hot swap, wherein the player is not required to shut down the light version and restart with the full version. Rather, the transition to the full version is such that the player can continue play without disruption of the game play. In particular, the credit or monetary balance, levels in the game, etc. are not lost as such data is transitioned from the light version to the full version. Also, the animations, images, audio, etc. can transition from low definition to high definition after the transition to the full version; new bonuses are now available, etc.

The device where the light version is played and the device where the full version is downloaded can be the same or different. In particular, the light version and the full version can be played on two different player devices. For example, the light version can be played on a player's mobile device. The player can then be provided the option to download the full version on their desktop computer.

In some example embodiments, the download progress can show which particular asset has been downloaded. For example, assume that the download includes five different assets. Also, assume that after the first 11% of the download, a new bonus (e.g., stacked wilds for a slot wagering game, a bonus multiplier, a big event bonus, etc.) is available. The player can then be given the option to switch to the full version as soon as a certain asset is downloaded and available. In such a situation, the player can start playing the full version without all of the assets being downloaded. After the other assets are downloaded, the player can be given the option to accept the install of the other four assets. Depending on when the switch occurred can affect the expected values based on the assets that are now part of the wagering game. In some example embodiments, the player can organize the order of the assets to be downloaded. Accordingly, the player can download what are considered more valued assets first (e.g., certain bonuses).

In some example embodiments, a peer-to-peer file sharing can occur among different player devices. For example, a Torrent or BitTorrent protocol can be used among the different player devices. In such a configuration, a player can opt in to allow other players to use their bandwidth for downloading wagering games. Such a configuration can enable these other players to download the wagering games quicker. In exchange for the player allowing the use of their bandwidth, the player receives various rewards as described herein. The amount of bandwidth can determine the amount and type of reward. For example, for 100-300 kilobytes of shared bandwidth, the reward includes a certain number of loyalty points. For more than 500 kilobytes of shared bandwidth, the reward includes a certain number of bonus credits, etc. Also, this peer-to-peer file sharing rewards can be for any type of data related to the wagering game. For example, in addition to a download of a full version of a wagering game, this file sharing can be for patches, system upgrades, etc. for wagering games that have already been downloaded.

In some example embodiments, the player device can download a wagering game into a wagering game machine at a wagering game establishment. For example, assume that the player has downloaded a full version of the wagering game onto their mobile device and has player specific data therein from prior wagering game play (e.g., a number of credits, a certain level in the game, etc.). Assume then the player wants to play this wagering game at a wagering game establishment. If the wagering game is already on a particular wagering game machine, the mobile device can download the player specific data into the wagering game machine and continue play. Alternatively if the wagering game is not available on the particular wagering game machine or on any wagering game machine at the wagering game establishment, the player's mobile device can download the full version of the wagering game (and possible the player specific data) into the wagering game machine. In some example embodiments, players would be provided rewards for downloading the wagering game from their mobile device into a wagering game machine at a wagering game establishment. Accordingly, (using player mobile devices) wagering games can be introduced into a wagering game establishment that may not be otherwise. Such embodiments provides a way to introduce a wagering game into a wagering game establishment that is not yet available, that has been rejected by the operator of the wagering game establishment, that is not offered to the wagering game establishment, etc. In other words, such embodiments are a way to virally promote a wagering game.

Different embodiments provide different ways that wagering game players can obtain rewards. Such embodiments can be combined. For example, a wagering game player can be provided greater rewards if they allow a full version of a wagering game to be downloaded and if they allow their player device to be used for peer-to-peer file sharing for downloading wagering games by other wagering game players. In another example, a wagering game player can be provided greater rewards if they allow a full version of a wagering game to be downloaded and if they download a wagering game from their mobile device to a wagering game machine at a wagering game establishment.

System Environment

This section describes an example system environment and presents structural aspects of some embodiments. This section includes an example system for providing rewards to wagering game players to download a full version of a wagering game into their player device. The wagering game players can be given the option for the download and rewards in response to initiating or playing a light version of the wagering game. This section will discuss FIGS. 1-3. The discussion of FIG. 1 will describe a system wherein a wagering game player is provided with a reward to download a full version of a wagering game into their player device while the wagering game player is initiating or playing a light version of the wagering game. The discussion of FIG. 2 will describe a more detailed block diagram of a wagering game server and a player device. The discussion of FIG. 3 will describe a Graphical User Interface (GUI) widget that is one example of a reward of downloading a full version of the wagering game.

FIG. 1 depicts a system for providing rewards to wagering game players to download a full version of a wagering game into their player device during initiating or play of a light version of the wagering game, according to some example embodiments. In particular, FIG. 1 depicts a system 100 having a wagering game server 102 and a number of player devices 106-116 that are communicatively coupled through a network 104.

While the system 100 illustrates a single wagering game server, in some other example embodiments, the system 100 can include multiple wagering game servers for performing the operations herein. For example, the different operations performed by the wagering game server 102 can be executed in different wagering game servers. To illustrate, the wagering game server 102 includes operations to allow for play of a light version of a wagering game such that execution of the wagering game, the executable, associated game assets, etc. remain at the wagering game server 102. The visual and audible results of the light version of the wagering game are transmitted over the network 104 for output onto the player device. The wagering game server 102 also includes operations for downloading of a full version of the wagering game onto the player device such that the execution of the wagering game, the executable, associated game assets, etc. are located at the player device. In some example embodiments, the operations related to the light version can occur at a first wagering game server, and the operations related to the download of the full version can occur at a second wagering game server.

The player devices can be any type of device that allows for wagering game play and network communications with the wagering game server 102. As shown, the player devices can include a number of different types of devices. The player devices 106-108 include computers (e.g., laptop computers, notebook computers, etc.). The player devices 110-112 include mobile devices (e.g., smartphones, tablet computers, etc.). The player devices 114-116 include wagering game machines at a wagering game establishment 118.

Also, the system 100 depicts a number of communications between the wagering game server 102 and one of the player devices—the player device 106. In some other example embodiments, these communications can be between the wagering game server 102 and any of the player devices 106-116. Also, other types of communications can occur among the wagering game server 102 and the player devices 106-116. For example, a peer-to-peer file sharing can occur among different player devices. For example, a Torrent or BitTorrent protocol can be used among the different player devices. In such a configuration, a player can opt in to allow other players to use their bandwidth for downloading wagering games. Such a configuration can enable these other players to download the wagering games quicker. In exchange for the player allowing the use of their bandwidth, the player receives various rewards as described herein. The amount of bandwidth can determine the amount and type of reward.

In another example of other communications, the player device can download a wagering game into a wagering game machine at a wagering game establishment. For example, assume that the player has downloaded a full version of the wagering game onto their mobile device and has player specific data therein from prior wagering game play (e.g., a number of credits, a certain level in the game, etc.). Assume then the player wants to play this wagering game at a wagering game establishment. If the wagering game is already on a particular wagering game machine, the mobile device can download the player specific data into the wagering game machine and continue play. Alternatively if the wagering game is not available on the particular wagering game machine or on any wagering game machine at the wagering game establishment, the player's mobile device can download the full version of the wagering game (and possible the player specific data) into the wagering game machine. In some example embodiments, players would be provided rewards for downloading the wagering game from their mobile device into a wagering game machine at a wagering game establishment. These examples of other communications for the system 100 are further described in reference to the flowcharts depicted in FIGS. 5-6.

As shown in FIG. 1, a wagering game player 122 is playing a wagering game at the player device 106. A wagering game player 124 is playing a wagering game at the player device 108. A wagering game player 126 is playing a wagering game at the player device 110. A wagering game player 128 is playing a wagering game at the player device 112. A wagering game player 130 is playing a wagering game at the player device 114. A wagering game player 132 is playing a wagering game at the player device 116.

Various stages of example communications and operations related to play of a light version of the wagering game and downloading of a full version of the wagering game into a player device are also shown in FIG. 1. Prior to the description of these example communications and operations, FIG. 2 will be described to help in the description of these example communications and operations.

Figure 2:
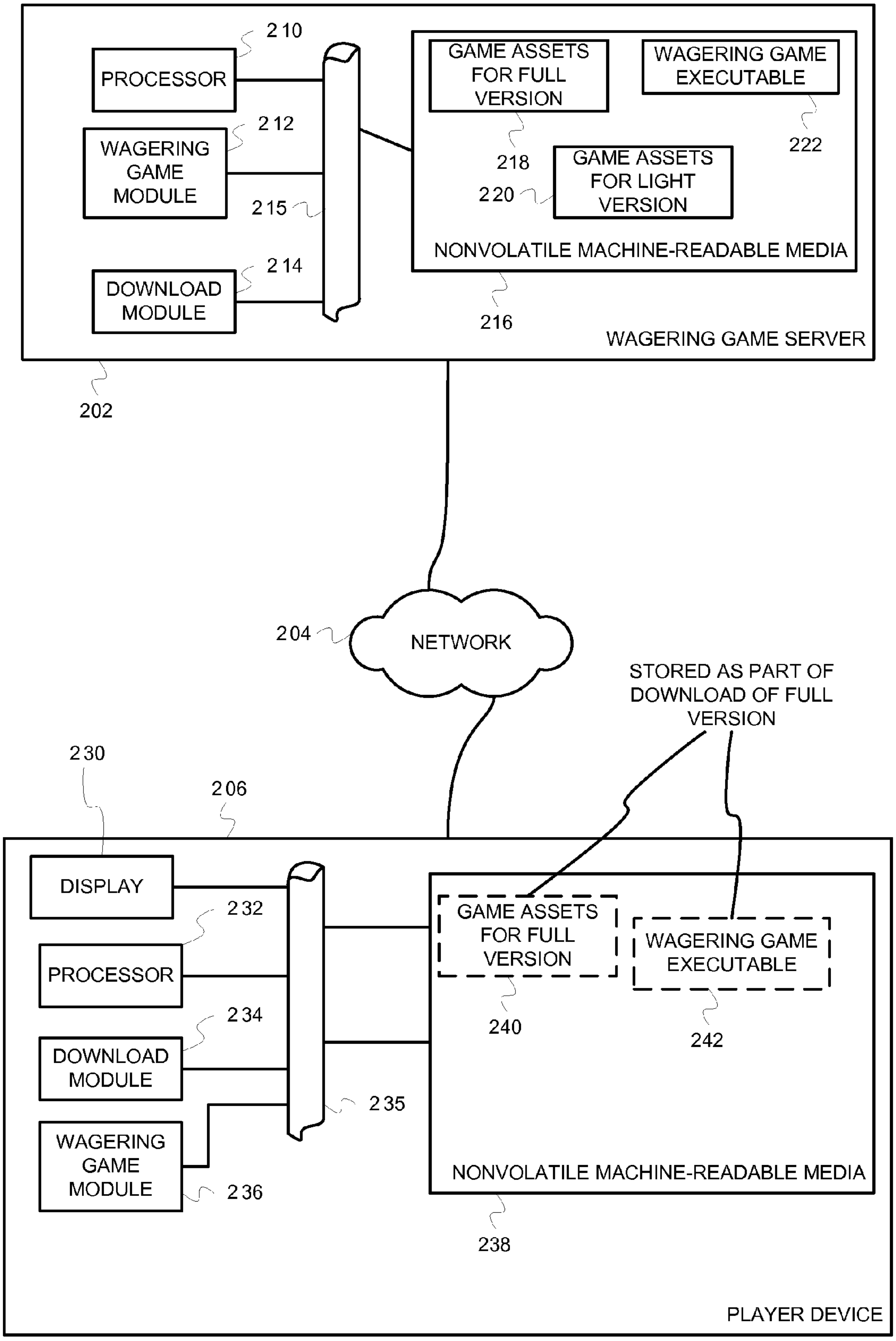
FIG. 2 depicts a more detailed block diagram of a wagering game server and a player device, according to some example embodiments.

FIG. 2 depicts a more detailed block diagram of a wagering game server and a player device, according to some example embodiments. FIG. 2 includes a wagering game server 202 and a player device 206 that are communicatively coupled together through a network 204. The wagering game server 202 is an example of the wagering game server 102 of FIG. 1. The player device 206 is an example of any one of the player devices 106-116 of FIG. 1. The network 204 is an example of the network 104 of FIG. 1.

The wagering game server 202 includes a processor 210, a wagering game module 212, a download module 214, and a nonvolatile machine-readable media 216 that are communicatively coupled together through a communication bus 215. The wagering game module 212 and the download module 214 can be software, firmware, hardware or a combination thereof. In some example embodiments, the wagering game module 212 and the download module 212 are software that is executed on the processor 210. The processor 210 can include any suitable processor, such as an Intel® Pentium processor, Intel® Core 2 Duo processor, AMD Opteron™ processor, or UltraSPARC processor.

The nonvolatile machine-readable media 216 can include any type of nonvolatile storage device. Examples of the nonvolatile machine-readable 216 includes read only memory (ROM), random access memory (RAM), magnetic disk storage media, optical storage media, flash memory machines, etc. In this example, the nonvolatile machine-readable media 216 is storing game assets and game executable for a wagering game. The nonvolatile machine-readable media 216 can store game assets and game executables for any number of wagering games. The nonvolatile machine-readable media 216 stores a wagering game executable 222, game assets for the light version of the wagering game 220, and game assets for the full version of the wagering game 222.

Game assets can include instructions for creating or outputting of bonus play, images, animations, video clips, sound tracks, art (e.g., reel strip and virtual image display information), math tables (e.g., probability distribution tables, pay tables, etc.), etc. as part of the play of the wagering game. These different game assets can be called or accessed by the wagering game executable 222 to output these bonus play, images, animations, video clips, sound tracks, art (e.g., reel strip and virtual image display information), math tables (e.g., probability distribution tables, pay tables, etc.), etc., as part of the play of the wagering game. The game assets for the light version 220 can differ from the game assets for the full version 222. In particular, the game assets for the full version 222 can have features not available in the game assets for the light version 220. For example, the game assets for the full version 222 can have a bonus play that is not available in the game assets for the light version 220. Additionally, the game assets for the light version 220 can have a lesser version in comparison to the game assets for the full version 222. For example, the game assets for the full version 222 can have an animation or audio clip that is of higher definition in comparison to this animation or audio in the game assets for the light version 220.

As further described below, the wagering game module 212 is configured to execute a light version of a wagering game on the processor 210 and transmit the results (e.g., video, audio, etc.) over the network 204 to the player device 206. Also, the download module 214 is configured to download a full version of the wagering game to the player device 206, after a wagering game player has elected the download. This full version of the wagering game can include the wagering game executable 222 and the game assets for the full version 218.

The player device 206 includes a display 230, a processor 232, a wagering game module 236, a download module 234, and a nonvolatile machine-readable media 238 that are communicatively coupled together through a communication bus 215. The wagering game module 236 and the download module 234 can be software, firmware, hardware or a combination thereof. In some example embodiments, the wagering game module 236 and the download module 234 are software that is executed on the processor 232. The processor 232 can include any suitable processor, such as an Intel® Pentium processor, Intel® Core 2 Duo processor, AMD Opteron™ processor, or U1traSPARC processor. The display 230 can be any type of display to show the visual results of play of the wagering game. Although not shown, the player device 206 can also include speakers for outputting of audio from play of the wagering game.

The nonvolatile machine-readable media 238 can include any type of nonvolatile storage device. Examples of the nonvolatile machine-readable 238 includes read only memory (ROM), random access memory (RAM), magnetic disk storage media, optical storage media, flash memory machines, etc. In this example, the nonvolatile machine-readable media 238 is storing game assets for the full version 240 and wagering game executable 242 for a wagering game. In this example, the game assets for the full version 240 and the wagering game executable 242 are copies of the game assets for the full version 218 and the wagering game executable 222 that have been downloaded as a result of a wagering game player accepting the option to perform the download. The nonvolatile machine-readable media 238 can store game assets and game executables for any number of wagering games.

As further described below, the wagering game module 212 is configured to execute the wagering game executable 242 using the game assets for the full version 240 for playing a full version of the wagering game at the player device 206. The wagering game module 236 can display the results of the wagering game on the display 230. Also, the download module 236 is configured to download a full version of the wagering game to the player device 206, after a wagering game player has elected the download.

Returning to the description of FIG. 1, operations 140-150 are now described with reference to FIG. 2. Operations start with a communication A 140. The communication A 140 is for a request to play of a light version of a wagering game. For example, the communication A 140 can be in response to the wagering game player 122 selecting a wagering game for play wherein the display is shown in a web browser. For the light version, the execution of the wagering game can occur at the wagering game server 102. The results can then be transmitted over the network 104 for output at the player device 106.

Communication B 142 is a communication to initiate play of the light version of the wagering game. The communication B 142 is in response to the communication A 140. With reference to FIG. 2, the wagering game executable 222 is executed by the wagering game module 212 at the wagering game server 202.

The output (e.g., video and audio) are transmitted over the network 204 for output at the player device 206 (e.g., visual output at the display 230).

Communication C 144 is also in response to the communication A 140. The communication C 144 is a communication to provide an option (that includes rewards) to the wagering game player to download a full version of the wagering game. This option can occur prior to or during game play of the light version of the wagering game. For example, a pop-up window can be display at the player device 106to allow the wagering game player 122 to select the option to download the full version of the wagering game. The rewards for the download may or may not be disclosed prior to the download. For example, some of the rewards are disclosed to encourage the wagering game player. Also, the player can be provided with additional rewards that they were not aware of until after the download is complete. For example, the additional rewards can double the number of bonus credits that were given during the download. These surprising additional rewards can provide the player with an incentive to download full versions of other wagering games—in anticipation of these additional rewards that may be provided for other downloads. With reference to FIG. 2, the download module 214 can transmit the communication C 144 to the player device 206.

Communication D 146 is in response to the communication C 144. The communication D 146 is a communication that elects the downloading of the full version of the wagering game while the wagering game player is playing the light version of the wagering game. In particular, the wagering game player 122 can select the option to initiate the downloading of the full version of the wagering game in exchange for receiving rewards for doing so. With reference to FIG. 2, the download module 234 can transmit the communication D 146 to the wagering game server 202.

Communication E 148 is in response to the communication D 146. The communication E 148 is a communication that includes the downloading of the full version of the wagering game to the player device 106 over the network 104. The full version can include a full version of the game assets and the wagering game executable. With reference to FIG. 2, the download module 214 downloads a copy of the game assets for the full version 218 and the wagering game executable 222 to the player device 206 over the network 204. The download module 234 can then store such data into the nonvolatile machine-readable media 238—shown as the game assets for the full version 240 and the wagering game executable 242.

Communication F 150 is also in response to the communication D 146. The communication F 150 is a communication that includes the rewards to the wagering game player in response to downloading of the full version of the wagering game. With reference to FIG. 2, the download module 214 can download the rewards.

Various rewards can include bonus credits, time-based multipliers, increased expected values for payouts, etc. for at least one of the light version and the full version of the wagering game. Various rewards can also include loyalty points for their player accounts that can translate into various prizes, discounts, etc. (e.g., free meal, free drinks, etc.). For example, a player can receive loyalty points for initiating the download and also receive at least one of bonus credits, time-based multipliers and increased expected values for the full version of the wagering game.

The rewards can be provided as certain percentages of the download are achieved. For example, the player can receive a bonus credit for every 10% of the download of the full version. Also, the player can be provided with additional rewards that they were not aware of until after the download is complete. For example, the additional rewards can double the number of bonus credits that were given during the download. These surprising additional rewards can provide the player with incentive to download full versions of other wagering games—in anticipation of these additional rewards that may be provided for other downloads.

Other rewards can include allowing the player to change or personalize the look and feel of the wagering game, allowing the player to access certain content, allowing the player to unlock bonus episodes, etc. Other rewards can also include power up or points to advance up a leader board that includes the highest level winners of the wagering game. In some example embodiments, the rewards are not related to the wagering game. For example, the rewards can include a free drink, meal, entry into a drawing for various prizes, etc.

Figure 3:
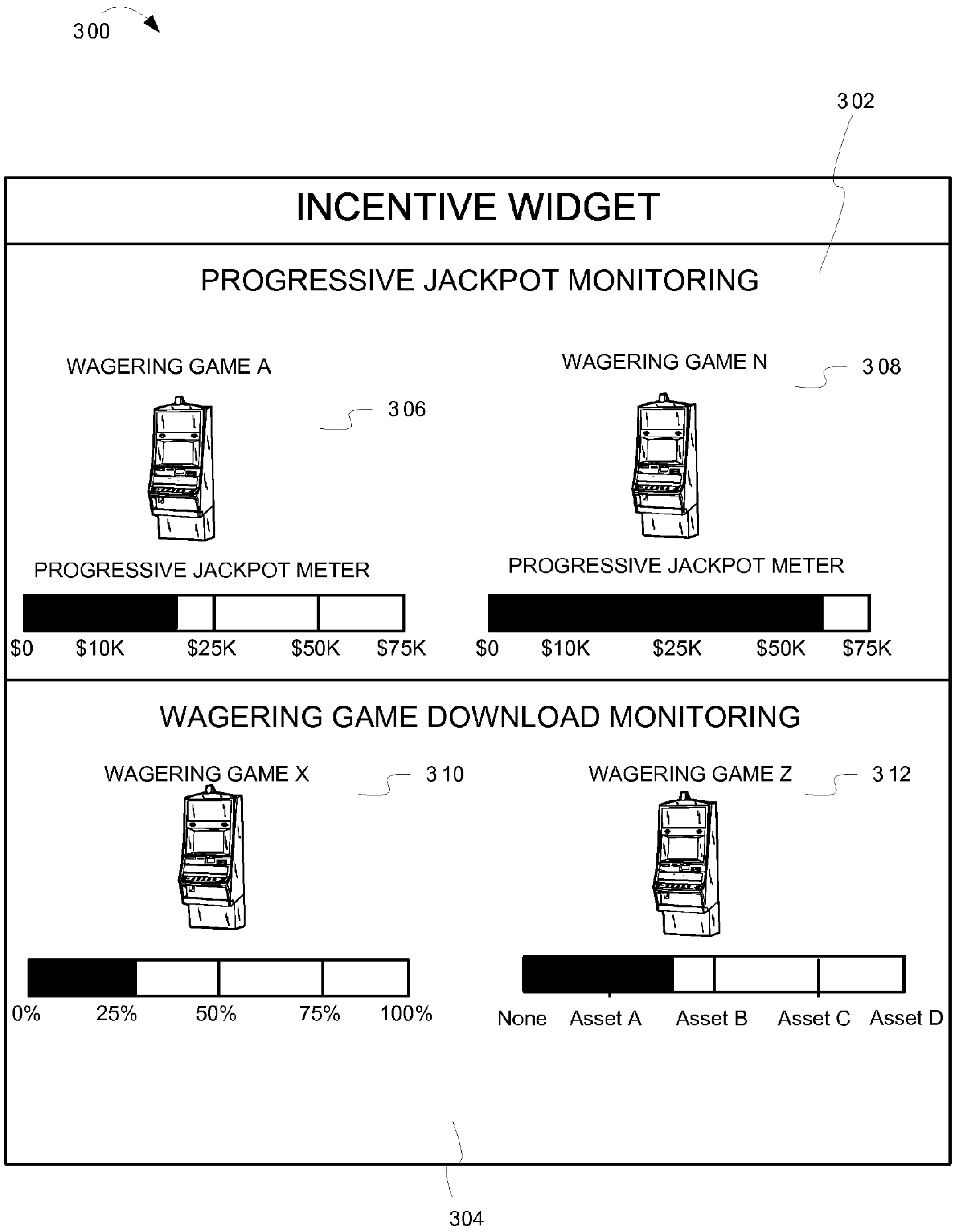
FIG. 3 depicts a display widget that is an example reward, according to some example embodiments.

Another reward can include a display widget used for displaying various data on the player's device. An example of the display widget is depicted in FIG. 3, which is described in more detail below. In some example embodiments, the reward can include a Quick Response (QR) code (that is a two dimensional bar code) that is displayed on the player's device. The QR code can be linked to various rewards (e.g., coupons for a drink or food, free mini-game play, bonus credits for a wagering game, etc.). Accordingly, the player can use their mobile phone or other device that is configured to read a QR code. The player can capture the QR code with such a device and can then be redirected to a website for the various rewards.

After the full version is downloaded, the light version can be replaced with the full version. In some example embodiments, the replacement is a hot swap, wherein the player is not required to shut down the light version and restart with the full version. Rather, the transition to the full version is such that the player can continue play without disruption of the game play. In particular, the credit or monetary balance, levels in the game, etc. are not lost as such data is transitioned from the light version to the full version. Also, the animations, images, audio, etc. can transition from low definition to high definition after the transition to the full version; new bonuses are now available, etc.

Also, in some example embodiments, the communications shown between the wagering game server 102 and the player device 106 can be separated into communications to multiple player devices. For example, the player device where the light version is played and the player device where the full version is downloaded can be different. In particular, the light version and the full version can be played on two different player devices. For example, the light version can be played on a player's mobile device. The player can then be provided the option to download the full version on their desktop computer.

FIG. 3 depicts a display widget that is an example reward, according to some example embodiments. In particular, FIG. 3 depicts a display widget 300 that is downloaded for use on a player device. The display widget is an example of a reward that the wagering game player receives for downloading a full version of the wagering game. In this example, the display widget 300 includes two sections—a progressive jackpot monitoring section 302 and a wagering game download monitoring 304.

The progressive jackpot monitoring section 302 provides a display of the progression of a progressive jackpot for a number of different wagering games. In this example, there is a monitoring 306 of a wagering game A and a monitoring 308 of a wagering game N. Accordingly, the wagering game player can easily monitor the progressive jackpots of a number of different wagering games that can be playable on the player device. In this example, the monitoring is based on the monetary amount of the progressive jackpot. The monitoring can also be based on the time lapse since the reset of the progressive jackpot. Such monitoring can allow the wagering game player to start play of a given progressive jackpot wagering game when certain levels are reached. For example, the wagering game player may want to start play after the progressive level has exceeded $50,000. In some example embodiments, the wagering game player can configure the display widget 300 to select which wagering games to monitor. In some other example embodiments, this selection is preconfigured. In some example embodiments, the wagering game player has more control and more options for the display widget 300 based on the number of downloads of a full version of wagering games that the wagering game player has elected. In particular, as more downloads are elected, more progressive jackpots can be monitored. Also as more downloads are elected, the wagering game player is given more options on which progressive jackpots to monitor.

The wagering game download monitoring 304 provides for monitoring of the downloads of full versions of wagering games that are occurring. In this example, there is a monitoring 310 of the download of wagering game X and a monitoring 312 of the download of wagering game Z. Accordingly, the wagering game player can easily monitor the downloads that are occurring. The monitoring 310 provides monitoring of the full version based on a percentage of the total download. The monitoring 312 provides monitoring of the full version based on the specific assets within the full version that are downloaded. In this example, asset A is first downloaded; asset B is then downloaded; asset C is then downloaded; and then asset D is downloaded. In some example embodiments, the wagering game player can configure the order of the assets to be downloaded. For example, the player can download what are considered more valued assets first (e.g., certain bonuses). Also, the wagering game player can then be given the option to switch to the full version as soon as a certain asset is downloaded and available. In such a situation, the player can start playing the full version without all of the assets being downloaded. After the other assets are downloaded, the player can be given the option to accept the install of the other four assets. Depending on when the switch occurred can affect the expected values based on the assets that are now part of the wagering game. In some example embodiments, the wagering game player has more control and more options for these downloads based on the number of downloads of a full version of wagering games that the wagering game player has elected. In particular, after a threshold number of downloads are elected, the wagering game player is allowed to configure downloads as described for the monitoring 312. If below a threshold number of downloads are elected, the wagering game player is only allowed the monitoring described for the monitoring 310.

Example Operations

This section describes operations associated with some example embodiments. In the discussion below, the flowcharts will be described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some example embodiments, the operations can be performed in series, while in other embodiments, one or more of the operations can be performed in parallel. Moreover, some embodiments can perform less than all the operations shown in any flowchart.

Figure 4:
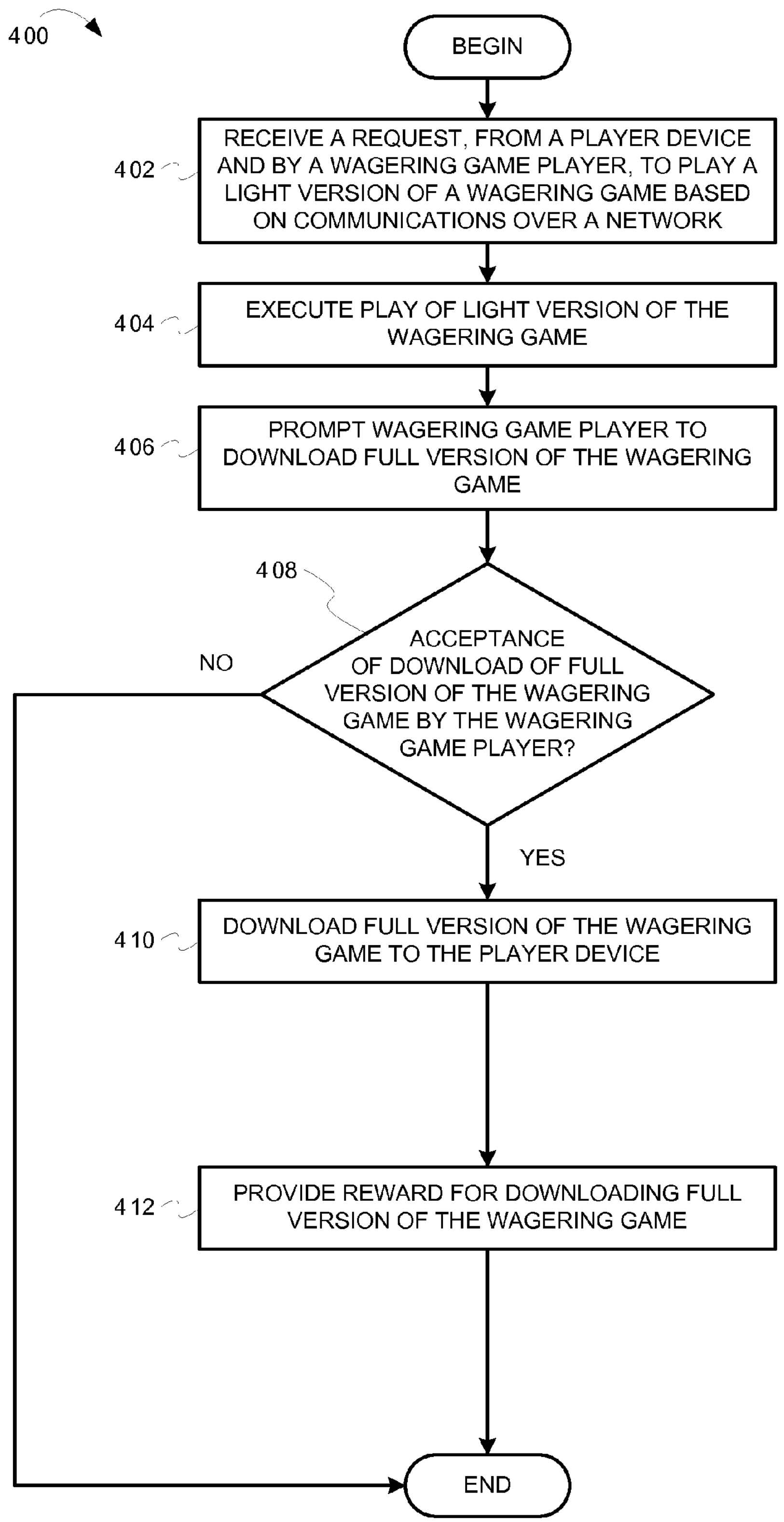
FIG. 4 depicts a flowchart for providing rewards to wagering game players to download a full version of a wagering game into their player device during initiating or play of a light version of the wagering game, according to some example embodiments.
Figure 5:
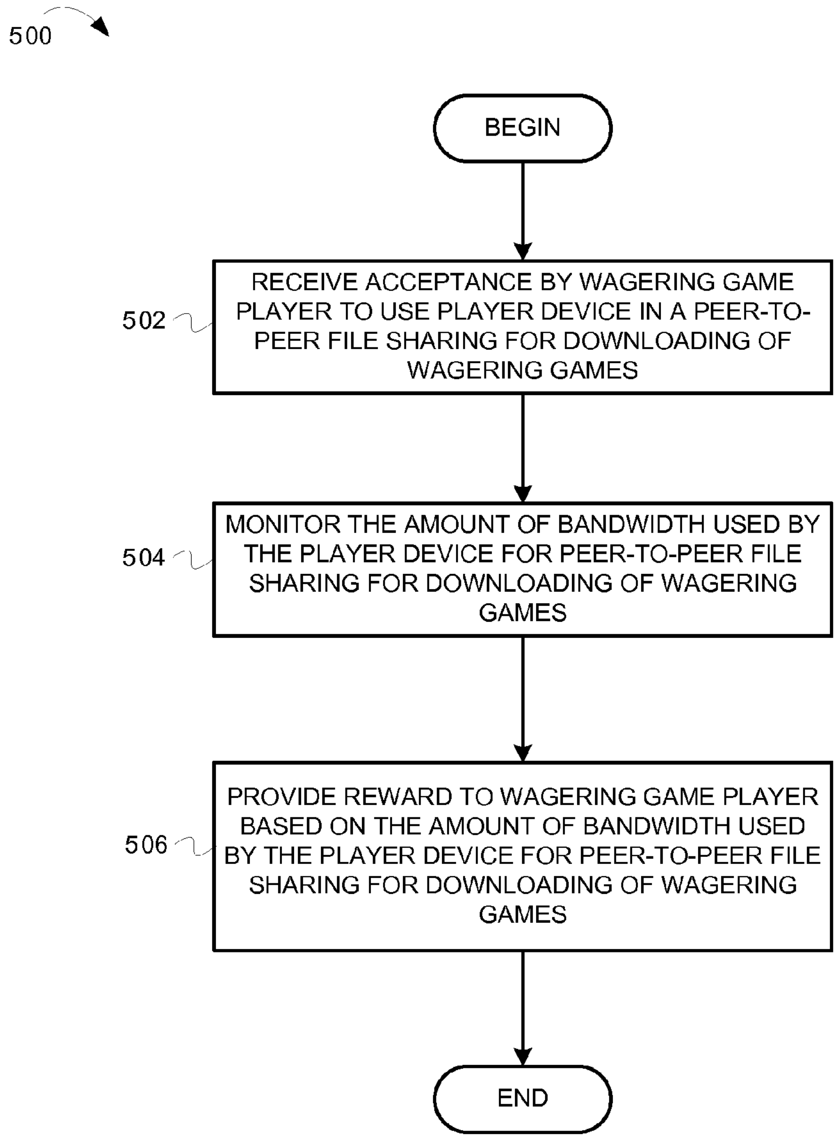
FIG. 5 depicts a flowchart for providing rewards to wagering game players for allowing their player device to be used as part of a peer-to-peer file sharing for downloading of wagering games, according to some example embodiments.
Figure 6:
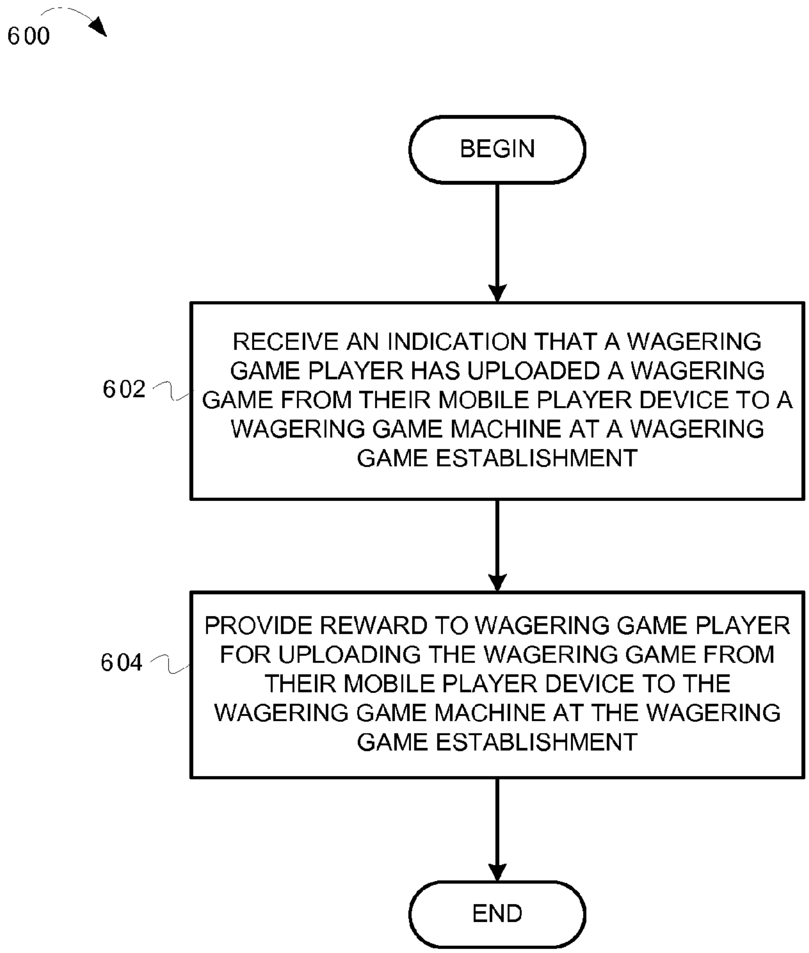
FIG. 6 depicts a flowchart for providing rewards to wagering game players for uploading a wagering game from their mobile device to a wagering game machine at a wagering game establishment, according to some example embodiments.

The section will discuss FIGS. 4-6. The discussion of FIG. 4 will describe operations for providing rewards to wagering game players to download a full version of a wagering game into their player device during initiating or play of a light version of the wagering game. The discussion of FIG. 5 will describe operations for providing rewards to wagering game players for allowing their player device to be used as part of a peer-to-peer file sharing for downloading of wagering games. The discussion of FIG. 6 will describe operations for providing rewards to wagering game players for uploading a wagering game from their mobile device to a wagering game machine at a wagering game establishment.

FIG. 4 depicts a flowchart for providing rewards to wagering game players to download a full version of a wagering game into their player device during initiating or play of a light version of the wagering game, according to some example embodiments. The operations of a flowchart 400 are described in reference to FIGS. 1-2. The operations of the flowchart 400 begin at block 402.

At block 402, a wagering game module 212 receives a request, from a player device and by a wagering game player, to play a light version of a wagering game based on communications over a network. With reference to FIGS. 1-2, the wagering module 212 receives the request through the communication A 140. For example, the communication A 140 can be in response to the wagering game player 122 selecting a wagering game for play wherein the display is shown in a web browser. For the light version, the execution of the wagering game can occur at the wagering game server 102. The results can then be transmitted over the network 104 for output at the player device 106. The operations of the flowchart 400 continue at block 404.

At block 404, the wagering game module 212 executes play of the light version of the wagering game. With reference to FIG. 1, communication B 142 is a communication to initiate play of the light version of the wagering game. With reference to FIG. 2, the wagering game executable 222 is executed by the wagering game module 212 at the wagering game server 202. The output (e.g., video and audio) are transmitted over the network 204 for output at the player device 206 (e.g., visual output at the display 230). The operations of the flowchart 400 continue at block 406.

At block 406, the download module 214 prompts wagering game player to download full version of the wagering game. With reference to FIG. 1, the communication C 144 is a communication to provide an option (that includes rewards) to the wagering game player to download a full version of the wagering game. This option can occur prior to or during game play of the light version of the wagering game. For example, a pop-up window can be display at the player device 106 to allow the wagering game player 122 to select the option to download the full version of the wagering game. The rewards for the download may or may not be disclosed prior to the download. For example, some of the rewards are disclosed to encourage the wagering game player. Also, the player can be provided with additional rewards that they were not aware of until after the download is complete. For example, the additional rewards can double the number of bonus credits that were given during the download. These surprising additional rewards can provide the player with reward to download full versions of other wagering games—in anticipation of these additional rewards that may be provided for other downloads. With reference to FIG. 2, the download module 214 can transmit the communication C 144 to the player device 206. The operations of the flowchart 400 continue at block 408.

At block 408, the download module 214 determines whether the wagering game player has acceptance of download of full version of the wagering game by the wagering game player. With reference to FIG. 1, the player device 106 can transmit a communication of whether the wagering game player has accepted the download of the full version of the wagering game. For example, the communication D 146 is a communication that elects the downloading of the full version of the wagering game while the wagering game player is playing the light version of the wagering game. In particular, the wagering game player 122 can select the option to initiate the downloading of the full version of the wagering game in exchange for receiving rewards for doing so. With reference to FIG. 2, the download module 234 can transmit the communication D 146 to the wagering game server 202. If the wagering game player does not accept the download of the full version, the operations of the flowchart 400 are complete. Otherwise, the operations continue at block 410.

At block 410, the download module 214 downloads the full version of the wagering game to the player device. With reference to FIG. 1, the communication E 148 is a communication that includes the downloading of the full version of the wagering game to the player device 106 over the network 104. The full version can include a full version of the game assets and the wagering game executable. With reference to FIG. 2, the download module 214 downloads a copy of the game assets for the full version 218 and the wagering game executable 222 to the player device 206 over the network 204. The download module 234 can then store such data into the nonvolatile machine-readable media 238—shown as the game assets for the full version 240 and the wagering game executable 242. The operations of the flowchart 400 continue at block 412.

At block 412, the download module 214 provides rewards for downloading full version of the wagering game. With reference to FIG. 1, the communication F 150 is a communication that includes the rewards to the wagering game player in response to downloading of the full version of the wagering game. With reference to FIG. 2, the download module 214 can download the rewards. The amount and type of rewards can vary. Also, the rewards provided can be any of the rewards described above for a wagering game player allowing a download of a full version of a wagering game (e.g., bonus credits, time-based multipliers, increased expected values for payouts, etc.). The operations of the flowchart 400 are complete.

FIG. 5 depicts a flowchart for providing rewards to wagering game players for allowing their player device to be used as part of a peer-to-peer file sharing for downloading of wagering games, according to some example embodiments. In particular, a peer-to-peer file sharing can occur among different player devices. In such a configuration, a player can opt in to allow other players to use their bandwidth for downloading wagering games. Such a configuration can enable these other players to download the wagering games quicker. In exchange for the player allowing the use of their bandwidth, the player receives various rewards as described herein. Also, this peer-to-peer file sharing rewards can be for any type of data related to the wagering game. For example, in addition to a download of a full version of a wagering game, this file sharing can be for patches, system upgrades, etc. for wagering games that have already been downloaded. The operations of a flowchart 500 are described in reference to FIGS. 1-2. The operations of the flowchart 500 begin at block 502.

At block 502, the download module 214 receives acceptance by wagering game player to use their player device in a peer-to-peer file sharing for downloading of wagering games. With reference to FIG. 1, the wagering game player 124 can transmit a communication to the wagering game server 102 to allow the player device 108 to be used in a peer-to-peer file sharing for downloading of wagering games by any of the other player devices that are part of the peer-to-peer file sharing for downloading of wagering games. For example, the wagering game player 126 can download at least part of a full version of a wagering game from the wagering device 108 to the player device 110. In some example embodiments, a Torrent or BitTorrent protocol can be used among the different player devices. The operations of the flowchart 500 continue at block 504.

At block 504, the download module 214 monitors the amount of bandwidth used by the player device for peer-to-peer file sharing for downloading of wagering games. In particular, the amount of bandwidth can determine the amount and type of reward. For example, for 100-300 kilobytes of shared bandwidth, the reward includes a certain number of loyalty points. For more than 500 kilobytes of shared bandwidth, the reward includes a certain number of bonus credits, etc. The operations of the flowchart 500 continue at block 506.

At block 506, the download module 214 provides a reward to the wagering game player based on the amount of bandwidth used by the player device for peer-to-peer file sharing for downloading of wagering games. With reference to FIG. 1, the reward can be downloaded to the wagering game player 124 at the player device 108 over the network 104 from the wagering game server 102. The amount and type of rewards can vary. Also, the rewards provided can be any of the rewards described above for a wagering game player allowing a download of a full version of a wagering game (e.g., bonus credits, time-based multipliers, increased expected values for payouts, etc.). The operations of the flowchart 500 are complete.

FIG. 6 depicts a flowchart for providing rewards to wagering game players for uploading a wagering game from their mobile device to a wagering game machine at a wagering game establishment, according to some example embodiments. The operations of a flowchart 600 are described in reference to FIGS. 1-2. The operations of the flowchart 600 begin at block 602.

At block 602, the download module 214 receives an indication that a wagering game player has uploaded a wagering game from their mobile player device to a wagering game machine at a wagering game establishment. With reference to FIGS. 1-2, the wagering game player 128 can carry their mobile player device 112 into the wagering game establishment 118. The wagering game player 128 can then locate a wagering game machine therein to play (e.g., the wagering game machine 116). For example, assume that the wagering game player 128 has downloaded a full version of a wagering game onto the player device 112 and has player specific data therein from prior wagering game play (e.g., a number of credits, a certain level in the game, etc.). Assume then the wagering game player 128 wants to play this wagering game at the wagering game machine 116. If the wagering game is already on the wagering game machine 116, the player device 112 can download the player specific data into the wagering game machine 116 and continue play. Alternatively if the wagering game is not available on the wagering game machine 116 or on any wagering game machine at the wagering game establishment 118, the player's mobile device can download the full version of the wagering game (and possible the player specific data) into the wagering game machine 116. This communication between the player device 112 and the wagering game machine 116 can be wired or wireless (e.g., Bluetooth, Near Field Communication (NFC), etc.). After or during the upload, the download module 214 can be notified by the wagering game machine 116 over the network. The operations of the flowchart 600 continue at block 604.

At block 604, the download module 214 provides rewards to the wagering game player for uploading the wagering game from their mobile player device to the wagering game machine at the wagering game establishment. With reference to FIG. 1, the reward can be downloaded to the wagering game player 124 at the player device 112 over the network 104 from the wagering game server 102. The amount and type of rewards can vary. Also, the rewards provided can be any of the rewards described above for a wagering game player allowing a download of a full version of a wagering game (e.g., bonus credits, time-based multipliers, increased expected values for payouts, etc.). Accordingly, (using player mobile devices) wagering games can be introduced into a wagering game establishment that may not be otherwise. Such embodiments provides a way to introduce a wagering game into a wagering game establishment that is not yet available, that has been rejected by the operator of the wagering game establishment, that is not offered to the wagering game establishment, etc. In other words, such embodiments are a way to virally promote a wagering game. The operations of the flowchart 600 are complete.

Example Player Device Architecture

Figure 7:
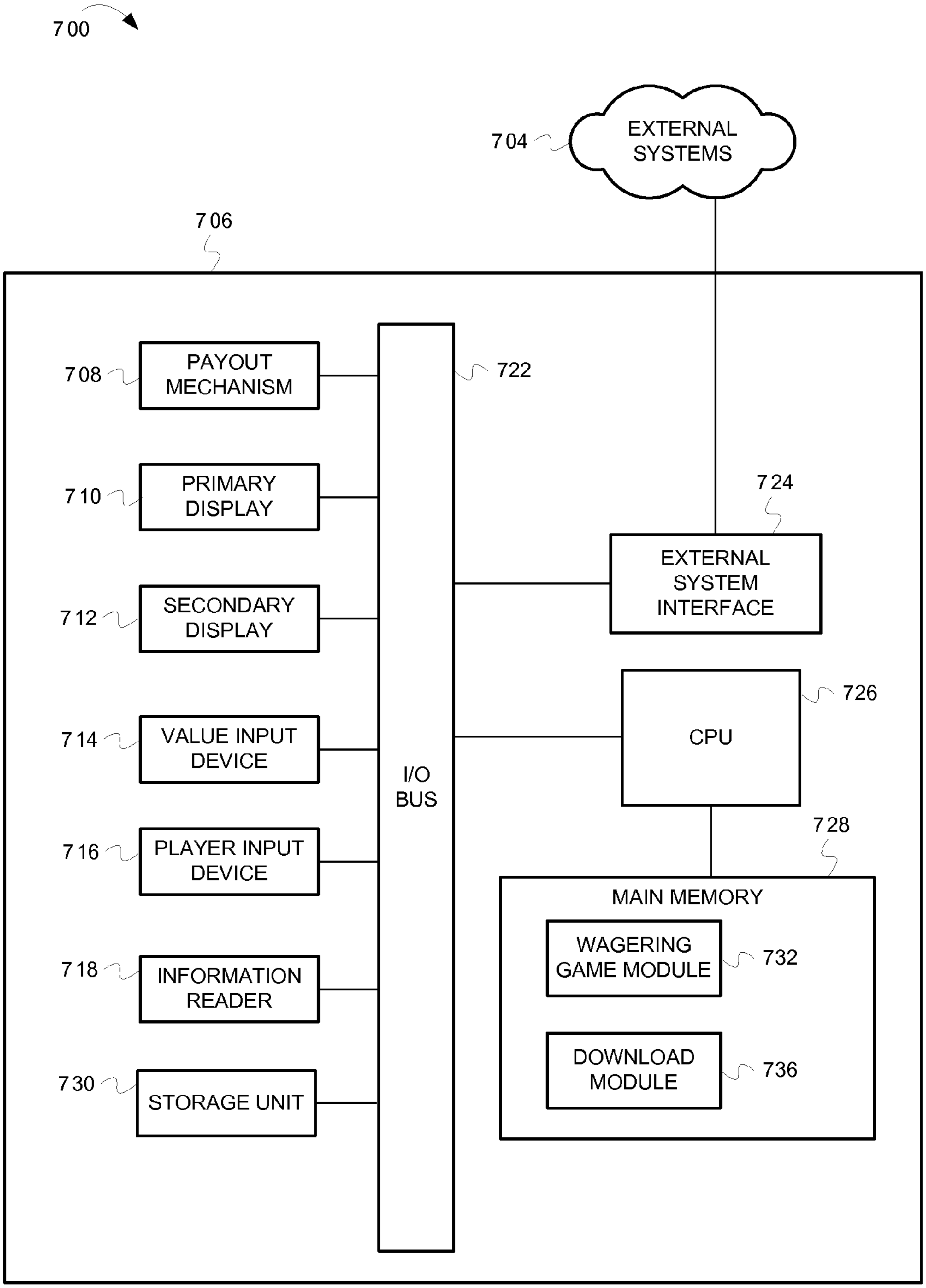
FIG. 7 depicts a block diagram illustrating a player device architecture, according to some example embodiments.

FIG. 7 depicts a block diagram illustrating a player device architecture, according to some example embodiments. As shown in FIG. 7, the player device architecture 700 includes a wagering game machine 706. The player device architecture 700 can be representative of the architecture for any of the player devices illustrated in FIG. 1 (the player devices 106-116). The wagering game machine 706 includes a central processing unit (CPU) 726 connected to main memory 728. The CPU 726 can include any suitable processor, such as an Intel® Pentium processor, Intel® Core 2 Duo processor, AMD Opteron™ processor, or U1traSPARC processor. The main memory 728 includes a wagering game module 732 and a download module 736. In one embodiment, the wagering game module 732 can present wagering games, such as video poker, video black jack, video slots, video lottery, etc., in whole or part. The download module 736 can perform the operations related to providing wagering game player rewards (as described above).

The CPU 726 is also connected to an input/output (I/O) bus 722, which can include any suitable bus technologies, such as an AGTL+frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems 704 (e.g., wagering game networks).

In one embodiment, the wagering game machine 706 can include additional peripheral devices and/or more than one of each component shown in FIG. 7. For example, in one embodiment, the wagering game machine 706 can include multiple external system interfaces 724 and/or multiple CPUs 726. In one embodiment, any of the components can be integrated or subdivided.

Any component of the architecture 700 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Player Devices

Figure 8:
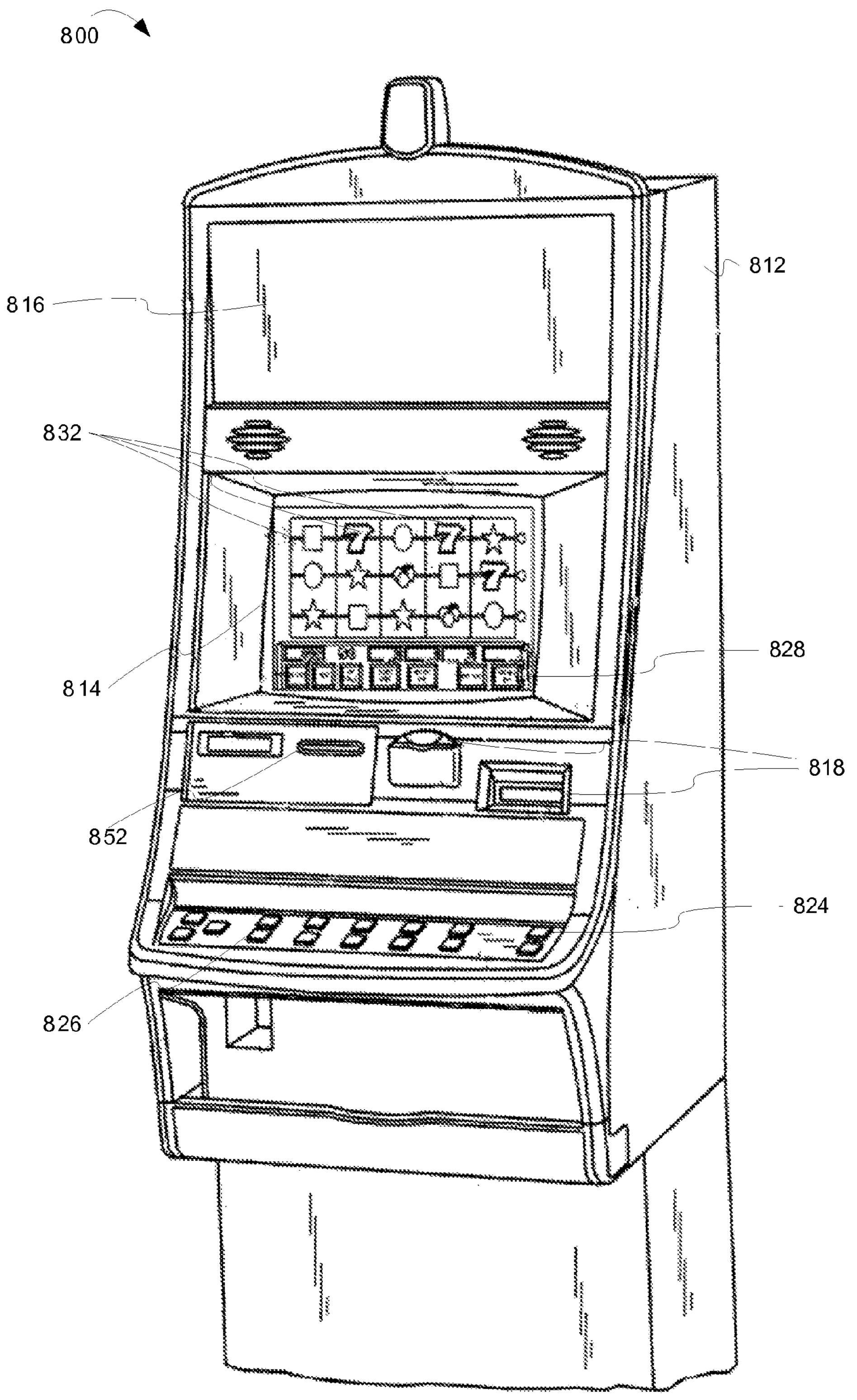
FIG. 8 depicts a perspective view of a wagering game machine, according to some example embodiments.

FIG. 8 depicts a perspective view of a wagering game machine, according to some example embodiments. Referring to FIG. 8, a wagering game machine 800 is used in gaming establishments, such as casinos. With reference to FIG. 1, the wagering game machine 800 can be an example of the player devices 114-116. According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bartop model, mobile handheld model, or workstation console model.

A player begins playing a basic wagering game by making a wager via the value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

Figure 9:
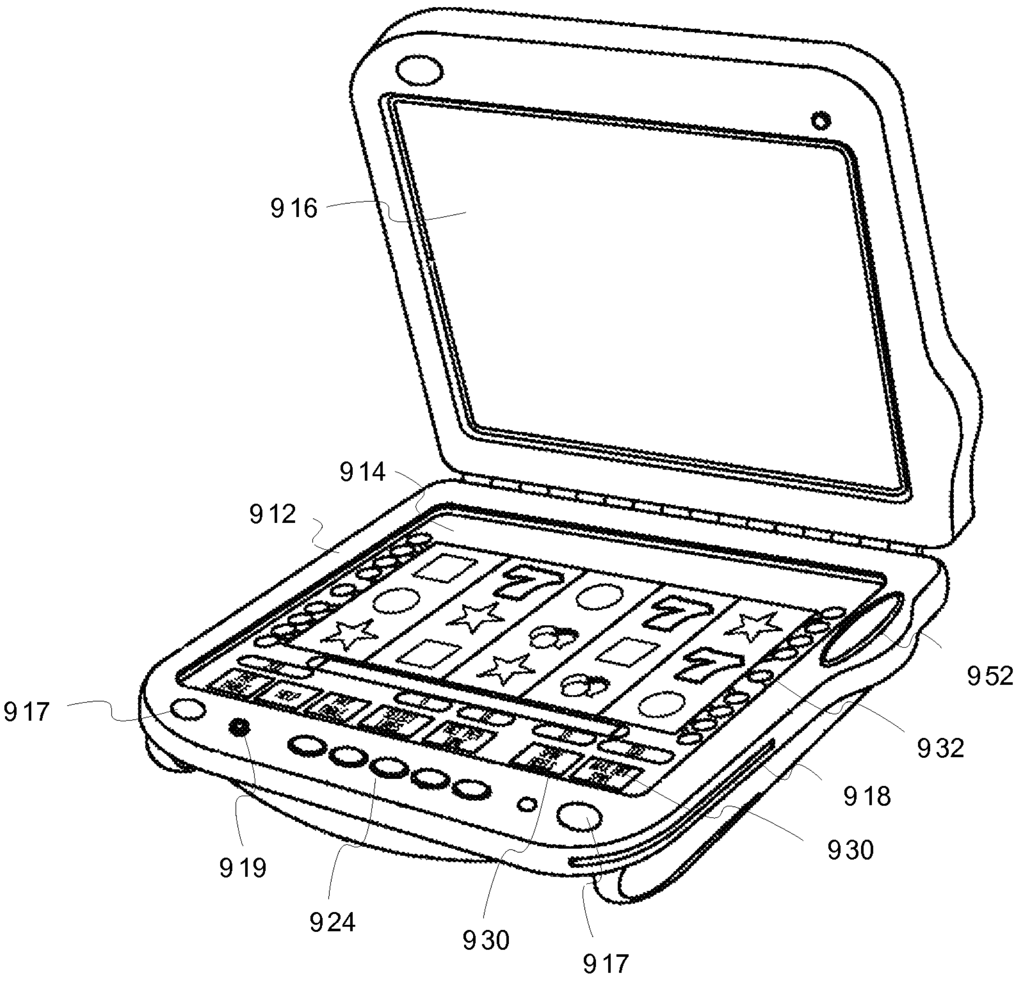
FIG. 9 depicts a mobile player device, according to some example embodiments.

FIG. 9 depicts a mobile player device, according to some example embodiments. In particular, FIG. 9 depicts an example embodiment of a wagering game machine 910. With reference to FIG. 1, the wagering game machine 910 can be an example of the player devices 110-112. Like free standing wagering game machines, in a handheld or mobile form, the wagering game machine 910 can include any suitable electronic device configured to play a video casino games such as blackjack, slots, keno, poker, blackjack, and roulette. The wagering game machine 910 comprises a housing 912 and includes input devices, including a value input device 918 and a player input device 924. For output, the wagering game machine 910 includes a primary display 914, a secondary display 916, one or more speakers 917, one or more player-accessible ports 919 (e.g., an audio output jack for headphones, a video headset jack, etc.), and other conventional I/O devices and ports, which may or may not be player-accessible. In the embodiment depicted in FIG. 9, the wagering game machine 910 comprises a secondary display 916 that is rotatable relative to the primary display 914. The optional secondary display 916 can be fixed, movable, and/or detachable/attachable relative to the primary display 914. Either the primary display 914 and/or secondary display 916 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 918 can comprise, for example, a slot located on the front, side, or top of the casing 912 configured to receive credit from a stored-value card (e.g., casino card, smart card, debit card, credit card, etc.) inserted by a player. The player-accessible value input device 918 can also comprise a sensor (e.g., an RF sensor) configured to sense a signal (e.g., an RF signal) output by a transmitter (e.g., an RF transmitter) carried by a player. The player-accessible value input device 918 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 910.

Still other player-accessible value input devices 918 can require the use of touch keys 930 on the touch-screen display (e.g., primary display 914 and/or secondary display 916) or player input devices 924. Upon entry of player identification information and, preferably, secondary authorization information (e.g., a password, PIN number, stored value card number, predefined key sequences, etc.), the player can be permitted to access a player's account. As one potential optional security feature, the wagering game machine 910 can be configured to permit a player to only access an account the player has specifically set up for the wagering game machine 910. Other conventional security features can also be utilized to, for example, prevent unauthorized access to a player's account, to minimize an impact of any unauthorized access to a player's account, or to prevent unauthorized access to any personal information or funds temporarily stored on the wagering game machine 910.

The player-accessible value input device 918 can itself comprise or utilize a biometric player information reader which permits the player to access available funds on a player's account, either alone or in combination with another of the aforementioned player-accessible value input devices 918. In an embodiment wherein the player-accessible value input device 918 comprises a biometric player information reader, transactions such as an input of value to the wagering game machine 910, a transfer of value from one player account or source to an account associated with the wagering game machine 910, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 918 comprising a biometric player information reader can require a confirmatory entry from another biometric player information reader 952, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 918 can be provided remotely from the wagering game machine 910.

The player input device 924 comprises a plurality of push buttons on a button panel for operating the wagering game machine 910. In addition, or alternatively, the player input device 924 can comprise a touch screen mounted to a primary display 914 and/or secondary display 916. In one aspect, the touch screen is matched to a display screen having one or more selectable touch keys 930 selectable by a user's touching of the associated area of the screen using a finger or a tool, such as a stylus pointer. A player enables a desired function either by touching the touch screen at an appropriate touch key 930 or by pressing an appropriate push button on the button panel. The touch keys 930 can be used to implement the same functions as push buttons. Alternatively, the push buttons 926 can provide inputs for one aspect of the operating the game, while the touch keys 930 can allow for input needed for another aspect of the game. The various components of the wagering game machine 910 can be connected directly to, or contained within, the casing 912, as seen in FIG. 9, or can be located outside the casing 912 and connected to the casing 912 via a variety of wired (tethered) or wireless connection methods. Thus, the wagering game machine 910 can comprise a single unit or a plurality of interconnected (e.g., wireless connections) parts which can be arranged to suit a player's preferences.

The operation of the basic wagering game on the wagering game machine 910 is displayed to the player on the primary display 914. The primary display 914 can also display the bonus game associated with the basic wagering game. The primary display 914 preferably takes the form of a high resolution LCD, a plasma display, an LED, or any other type of display suitable for use in the wagering game machine 910. The size of the primary display 914 can vary from, for example, about a 2-3" display to a 15" or 17" display. In at least some embodiments, the primary display 914 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 914 and/or secondary display 916 can have a 16:9 aspect ratio or other aspect ratio (e.g., 4:3). The primary display 914 and/or secondary display 916 can also each have different resolutions, different color schemes, and different aspect ratios.

As with the free standing embodiments a wagering gaming machine, a player begins play of the basic wagering game on the wagering game machine 910 by making a wager (e.g., via the value input device 918 or an assignment of credits stored on the handheld gaming machine via the touch screen keys 930, player input device 924, or buttons 926) on the wagering game machine 910. In some embodiments, the basic game can comprise a plurality of symbols arranged in an array, and includes at least one payline 932 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 918 of the wagering game machine 910 can double as a player information reader 952 that allows for identification of a player by reading a card with information indicating the player's identity (e.g., reading a player's credit card, player ID card, smart card, etc.). The player information reader 952 can alternatively or also comprise a bar code scanner, RFID transceiver or computer readable storage medium interface. In one embodiment, the player information reader 952 comprises a biometric sensing device.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

receiving a request, from a device, to play a light version of a wagering game based on communications over a network;

transmitting, to the device, wagering game content associated with execution of the light version of the wager game;

responsive to the request to play the light version of the wagering game, prompting download of a full version of the wagering game over the network from a remote server during the executing of the light version of the wagering game, wherein a size of the light version of the wagering game is less than a size of the full version of the wagering game, and wherein the full version of the wagering game has more game features than the light version of the wagering game;

detecting acceptance of download of the full version of the wagering game; and responsive to acceptance of the download of the full version of the wagering game to the device, downloading the full version of the wagering game; and providing a reward for the downloading of the full version of the wagering game, the reward being related to at least one of wagering game play of the light version of the wagering game and wagering game play of the full version of the wagering game.

2. The method of claim 1, wherein the reward comprises a reward that is undisclosed until issued, wherein the reward is issued after the download of the full version of the wagering game.

3. The method of claim 1, further comprising transmitting an instruction, to the device, to hot swap from the light weight version of the wagering game to the full version of the wagering game during wagering game play, after the download of the full version of the wagering game is complete.

4. The method of claim 1, wherein the full version of the wagering game comprises at least one of a bonus play and a higher expected value that is not available in the light version of the wagering game.

5. The method of claim 1, wherein the downloading of the full version of the wagering game comprises downloading the full version of the wagering game for wagering game play of the full version of the wagering game into a device that is different from the device where the light version of the wagering game is executed.

6. A method comprising:

receiving a request, from a device, to play a light version of a wagering game based on communications over a network;

transmitting, to the device, wagering game content associated with execution of the light version of the wager game;

responsive to the request to play the light version of the wagering game, prompting download of a full version of the wagering game over the network from a remote server during the executing of the light version of the wagering game, wherein a size of the light version of the wagering game is less than a size of the full version of the wagering game, and wherein the full version of the wagering game has more game features than the light version of the wagering game;

detecting acceptance of download of the full version of the wagering game; and responsive to acceptance of the download of the full version of the wagering game to the device, downloading the full version of the wagering game; and providing a reward to download the full version of the wagering game, the reward comprising a reward for wagering game play each time a defined percentage of the download of the full version of the wagering game is reach, the defined percentage being less than 100 percent.

7. The method of claim 6, wherein the reward comprises a reward that is undisclosed until issued, wherein the reward is issued after the download of the full version of the wagering game.

8. The method of claim 6, further comprising transmitting an instruction, to the device, to hot swap from the light weight version of the wagering game to the full version of the wagering game during wagering game play, after the download of the full version of the wagering game is complete.

9. The method of claim 6, wherein the full version of the wagering game comprises at least one of a bonus play and a higher expected value that is not available in the light version of the wagering game.

10. The method of claim 6, wherein the downloading of the full version of the wagering game comprises downloading the full version of the wagering game for wagering game play of the full version of the wagering game into a device that is different from the device where the light version of the wagering game is executed.

11. A wagering game machine comprising:

a processor;

a wagering game module, executable on the processor, configured to present a light version of a wagering game on which monetary value can be wagering;

a download module, executable on the processor, wherein the download module is configured to, responsive to play the light version of the wagering game, receiving a request to download of a full version of the wagering game over the network from a remote server during the executing of the light version of the wagering game, wherein a size of the light version of the wagering game is less than a size of the full version of the wagering game, and wherein the full version of the wagering game has more game features than the light version of the wagering game;

transmit acceptance of download of the full version of the wagering game; and responsive to acceptance of the download of the full version of the wagering game to the device, receive a download of the full version of the wagering game; and receive a reward for the download of the full version of the wagering game, the reward being related to at least one of wagering game play of the light version of the wagering game and wagering game play of the full version of the wagering game.

12. The wagering game machine of claim 11, wherein the reward comprises a reward for wagering game play each time a defined percentage of the download of the full version of the wagering game is reach, the defined percentage being less than 100 percent.

13. The wagering game machine of claim 11, wherein the reward comprises a reward that is undisclosed until issued, wherein the reward is issued after the download of the full version of the wagering game.

14. The wagering game machine of claim 11, wherein the wagering game module is configured to, responsive to completing the download of the full version of the wagering game, perform a hot swap from the light weight version of the wagering game to the full version of the wagering game during wagering game play.

15. The wagering game machine of claim 11, wherein the full version of the wagering game comprises at least one of a bonus play and a higher expected value that is not available in the light version of the wagering game.

16. One or more non-transitory machine-readable storage media having instructions stored thereon which, when executed by one or more processors, cause the one or more processors to perform operations comprising:

receive a request, from a device, to play a light version of a wagering game based on communications over a network;

transmit, to the device, wagering game content associated with execution of the light version of the wager game;

responsive to the request to play the light version of the wagering game, prompt download of a full version of the wagering game over the network from a remote server during the executing of the light version of the wagering game, wherein a size of the light version of the wagering game is less than a size of the full version of the wagering game, and wherein the full version of the wagering game has more game features than the light version of the wagering game;

detect acceptance of download of the full version of the wagering game; and responsive to acceptance of the download of the full version of the wagering game to the device, download the full version of the wagering game; and provide a reward to download the full version of the wagering game, the reward comprising a reward for wagering game play each time a defined percentage of the download of the full version of the wagering game is reach, the defined percentage being less than 100 percent.

17. The one or more non-transitory machine-readable storage media of claim 16, wherein the reward comprises a reward that is undisclosed until issued, wherein the reward is issued after the download of the full version of the wagering game.

18. The one or more non-transitory machine-readable storage media of claim 16, wherein the operations comprise transmit an instruction, to the device, to hot swap from the light weight version of the wagering game to the full version of the wagering game during wagering game play, after the download of the full version of the wagering game is complete.

19. The one or more non-transitory machine-readable storage media of claim 16, wherein the full version of the wagering game comprises at least one of a bonus play and a higher expected value that is not available in the light version of the wagering game.

20. The one or more non-transitory machine-readable storage media of claim 16, wherein the downloading of the full version of the wagering game comprises downloading the full version of the wagering game for wagering game play of the full version of the wagering game into a device that is different from the device where the light version of the wagering game is executed.

21. An apparatus comprising:

means for receiving a request, from a device, to play a light version of a wagering game based on communications over a network;

means for transmitting, to the device, wagering game content associated with execution of the light version of the wager game;

responsive to the request to play the light version of the wagering game, means for prompting download of a full version of the wagering game over the network from a remote server during the executing of the light version of the wagering game, wherein a size of the light version of the wagering game is less than a size of the full version of the wagering game, and wherein the full version of the wagering game has more game features than the light version of the wagering game;

means for detecting acceptance of download of the full version of the wagering game; and responsive to acceptance of the download of the full version of the wagering game to the device, means for downloading the full version of the wagering game; and means for providing a reward for the downloading of the full version of the wagering game, the reward being related to at least one of wagering game play of the light version of the wagering game and wagering game play of the full version of the wagering game.

22. The apparatus of claim 21, wherein the reward comprises a reward that is undisclosed until issued, wherein the reward is issued after the download of the full version of the wagering game.

23. The apparatus of claim 21, further comprising means for transmitting an instruction, to the device, to hot swap from the light weight version of the wagering game to the full version of the wagering game during wagering game play, after the download of the full version of the wagering game is complete.

24. The apparatus of claim 21, wherein the full version of the wagering game comprises at least one of a bonus play and a higher expected value that is not available in the light version of the wagering game.

25. The apparatus of claim 21, wherein the means for downloading of the full version of the wagering game comprises means for downloading the full version of the wagering game for wagering game play of the full version of the wagering game into a device that is different from the device where the light version of the wagering game is executed.

* * * * *